United States Patent [19]

Vossen

[11] Patent Number: 4,521,233
[45] Date of Patent: Jun. 4, 1985

[54] DISC COVER FOR A FRYING PAN OR VESSEL

[75] Inventor: Franz Vossen, Radolfzell, Fed. Rep. of Germany

[73] Assignee: Meurer NonFood Product GmbH, Radolfzell, Fed. Rep. of Germany

[21] Appl. No.: 481,842

[22] Filed: Apr. 4, 1983

[30] Foreign Application Priority Data

Apr. 5, 1982 [DE] Fed. Rep. of Germany ....... 3212646
May 6, 1982 [DE] Fed. Rep. of Germany ....... 3216952

[51] Int. Cl.³ .............................................. B65D 51/16
[52] U.S. Cl. ........................................ 55/384; 55/524; 55/529; 220/94 A; 220/370; 220/372
[58] Field of Search ................... 55/384, 524, 529; 220/369–373, 94 A

[56] References Cited

U.S. PATENT DOCUMENTS

| | | | |
|---|---|---|---|
| 2,464,301 | 3/1949 | Francis, Jr. ........................ | 55/524 |
| 3,137,589 | 6/1964 | Reihhard et al. ................... | 55/524 |
| 3,363,406 | 1/1968 | Miller .................................. | 55/384 |
| 3,528,236 | 9/1970 | Merrick .............................. | 55/384 |
| 4,119,543 | 10/1978 | Lawson et al. .................... | 55/524 |
| 4,298,135 | 11/1981 | Vossen ............................... | 55/384 |

FOREIGN PATENT DOCUMENTS 2824110 12/1978 Fed. Rep. of Germany ........ 55/524

Primary Examiner—David L. Lacey
Attorney, Agent, or Firm—Roberts, Spiecens and Cohen

[57] ABSTRACT

A disc-like cover for a frying pan comprising a disc stamped to form a carrier ring with a plurality of spoke-like radial arms connected to the ring and extending inwardly to a central region at which the radial arms merge together. A steam permeable filter of fibrous material is secured to the disc on one side thereof to cover open sectors formed in the disc between the arms. The filter is secured to the disc by a permanent adhesive. The arms each have a plurality of transverse relief cuts respectively extending from one radial edge of the associated arm partially across the width of the arm over a length greater than one-half of the width. The cuts extend parallel to one another in the region where the arms are joined to the carrier ring to form a weakening zone permitting limited change in shape of the arm. The adhesive between the filter and disc is reduced to a narrow zone at the relief cuts to leave an unadhered zone between the filter and disc adjacent the narrow zone.

5 Claims, 10 Drawing Figures

DISC COVER FOR A FRYING PAN OR VESSEL

FIELD OF THE INVENTION

This invention relates to a disc-like cover for frying pans or similar utensils, the cover having a steam-permeable filter surface of a fibrous filter element, especially of filter paper, as will as a handle, and in addition relates to a production method for such covers.

BACKGROUND

U.S. Pat. No. 3,528,236 discloses a pan cover consisting of a truncated pipe frame having spoke-like fan-type extensions into which a filter cloth can be inserted and then stretched by means of an inner clamping frame. The releasable attachment of this cloth on the carrier frame in the manner of a cloth that has to be fastened to a so-called embroidery frame makes it possible to replace the filter cloth once it has become filled with particles of fat that rise from food during the frying process after it has been used as a frying pan cover.

It has also been proposed that pan covers of this type be produced from a disc of filter paper, encased in a cardboard frame.

A cover having a carrier ring that surrounds the filter paper, cut out from a materials disc of cardboard or the like with spoke like radial arms and which is parallel to the plane of the filter paper or the like that is permanently attached to it and the radial arms is familiar from German patent diclosure No. 2,915,274 and entails the advantage—vis-a-vis other pan covers—that, on the one hand, it traps particles of fat without hindering the passage of the steam, and, on the other hand, is simple to produce and use as a disposable article.

Particularly in the case of fried foods that produce a relatively wet vapor during frying, it has been shown that—depending on the quality of the filter paper that is used—it is possible that this will buckle and will thus deform the whole cover.

SUMMARY OF THE INVENTION

In view of the above, an object of this invention has as its aim the production of a cover of the kind described above that is configured so that it is extremely simple to produce, is form and shape stable even when large quantities of steam are produced, and can be destroyed after being used once since it is a cheap, disposable item.

This object is achieved by a construction in which the vapor permeable areas of the filter are at least in part delimited by thickened areas in the filter material, these thickened areas having plastic additions that interlock with the filter, in particular, the pores of the filter serving as locking cavities for the plastic additions.

According to a further feature of the invention, these thickened areas display greater resistance to bending than the vapor permeable areas and thus impart shape stability to the disc-like cover as a whole in order that it can be positioned on the frying pan in the desired manner.

It has been found to be advantageous to provide the thickened areas in the form of strips, of which one optionally contains the handle element.

This cruciform or lattice thickening can act through an edge lip as a stiffening structure.

It is of importance that the thickened areas of the filter material itself are not formed by strips of material or the like that are applied to this, but are formed instead of areas of the filter material itself that is stiffened by hardenable additive materials; these additives are of hardenable plastic having a melting point that lies above 200 deg. C., that is in addition, non-aggressive to cellulose and thus does not attack the filter paper or the fibre fleece. In this regard, epoxy resins of the two component type have been found usable, and these can be applied to the filter material by either an impregnation or a vapor deposition method in a process according to this invention.

Using the process according to the invention it is possible to produce a filtering cover for a frying pan very simply, this cover satisfying the requirement for a cover that is steam permeable and that arrests rising fat particles and which, thanks to simple production methods, can be used as a disposable item. With such features it is unlike the pan cover described in U.S. Pat. No. 3,528,236, which must be cleaned, at least partially, after each use and is for this reason unpopular in the household.

Another cover—that is also deserving of protection—also lies within the framework of this invention; in this cover the radial arms, usually of a width of 20 mm, for example, are weakened in cross-section by a cut that extends from at least one of its edges; the adhesive joint between the radial arm and the filter surface is reduced at least in the area that is of weakened cross-section. This means that the pan cover is relieved to the point that deformation is no longer possible, in which regard the relieving cuts permit a limited change in shape in the radial arms and the reduction in adhesive force in this area enhances the described effect.

According to a further feature of the invention, at least two cuts are made in the radial arms, each of these extending from one side; these cuts are parallel and are preferably made perpendicular to the sides. The relieving cuts achieve the optimum effect if their length exceeds half the width of a radial arm, and amounts, for example, to two-thirds of this distance.

According to this invention, it is also foreseen that the radial arm is not joined to the filter paper by the lining process, or is joined only in narrow strips; even the latter version will be sufficient to ensure the unrestricted movement of the radial arm.

Practical trials have shown that the pan cover that is produced in accordance with the methods described above retains its shape very well as is desired.

According to a further feature of the invention, the radial arms and/or the carrier ring are joined to the filter paper by the so-called squeeze welding technique.

BRIEF DESCRIPTION OF THE DRAWING

Further features, advantages and details of the invention will emerge from the following description of an exemplary embodiment of the invention, on the basis of the drawings appended hereto, in which.

DETAILED DESCRIPTION OF PREFERRED EMBODIMENTS

Figure 2:
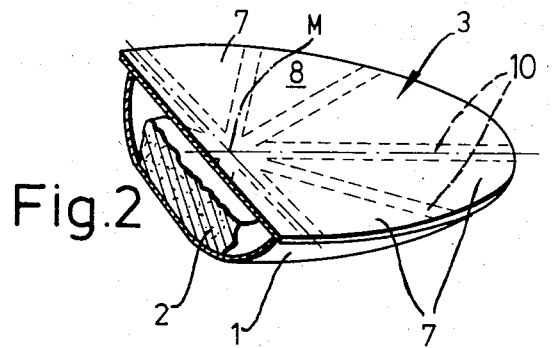
FIG. 2 is an oblique view on a smaller scale and in a cross-section of another version of a filter disc in place on a frying pan.

A frying pan 1, used particularly to fry chunks of meat 2, is covered by means of a stiff filter disc 3. The disc 3 is substantially circular and is stamped from a strip B (FIG. 5) of fibrous filter paper; projections 5 extend from the edge 4 of the disc and these serve as grips. A modified grip—is shown as the handle 5s.

Figure 1:
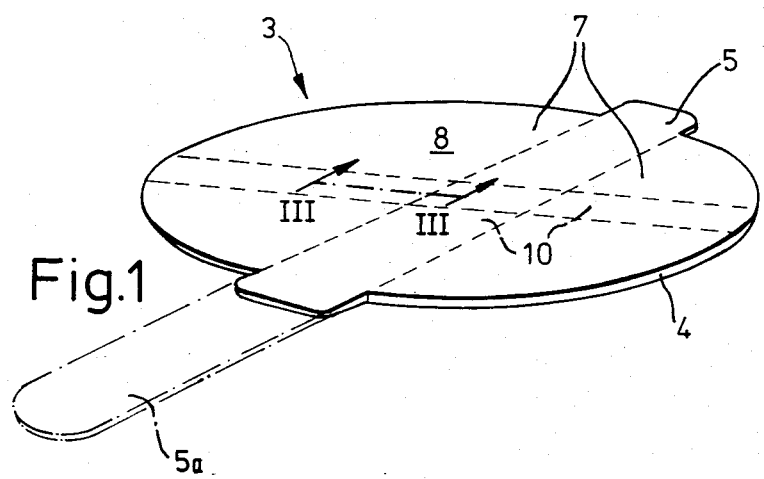
FIG. 1 is an oblique view of a pan cover in the form of a filter disc.

In FIG. 1 the filter disc 3 has two thickened areas 10 in the form of strips that cross over each other; in FIG. 2 these extend radially from the center point M of the disc. Between the thickened zones 10 there are filter sectors 7.

The thickened zones 10 are formed by an impregnation method, in the course of which a liquid or vaporized hardenable additive material, for example, a two component epoxy resin 11, is applied to the filter disc in the area of each of the thickened areas. The material 11 penetrates at least partially the filter paper of the filter disc and bonds internally to the filter paper by means of the inclusions 13 that fill the pores 12.

Figure 3:
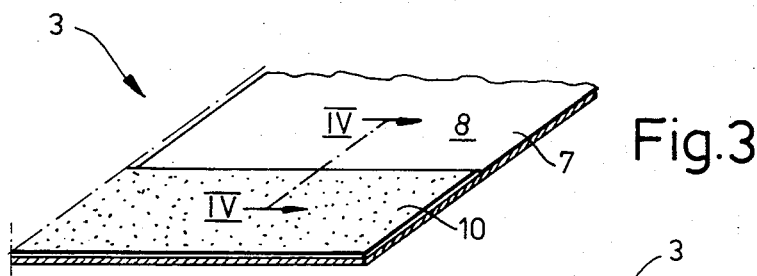
FIG. 3 is an enlarged cross-section in FIG. 1 on the line III—III.
Figure 4:
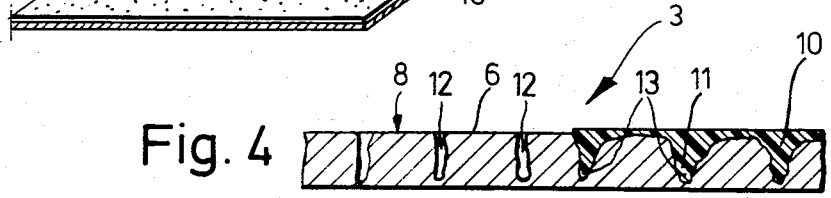
FIG. 4 is a cross-section in FIG. 3 on the line IV—IV, this being an enlarged and exaggerated cross-section.

These thickened zones 10 with the additive material 11 applied on one or both sides of the filter paper are barely perceptible on the filter disc that is produced; in FIGS. 3 and 4 they have been greatly exaggerated in the interests of greater clarity.

Figure 5:
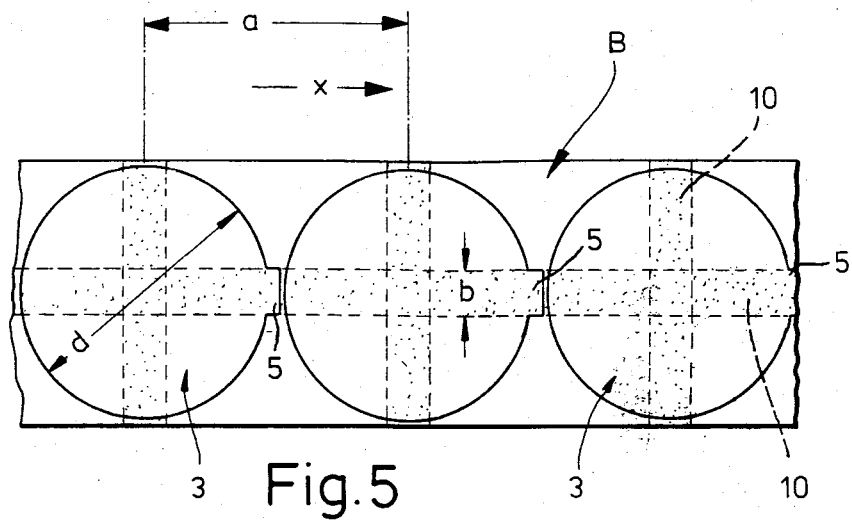
FIG. 5 is a plan view of a filter strip during the production process for the filter discs.

FIG. 5 shows a manufacturing process in which a moving strip B of filter material is provided with thickened zones 10 in both its lateral and transverse directions these being of a selected width b—also exaggerated; the mean distance a of the transverse thickened zones 10 is somewhat greater than the diameter d of the filter discs 3.

Figure 6:
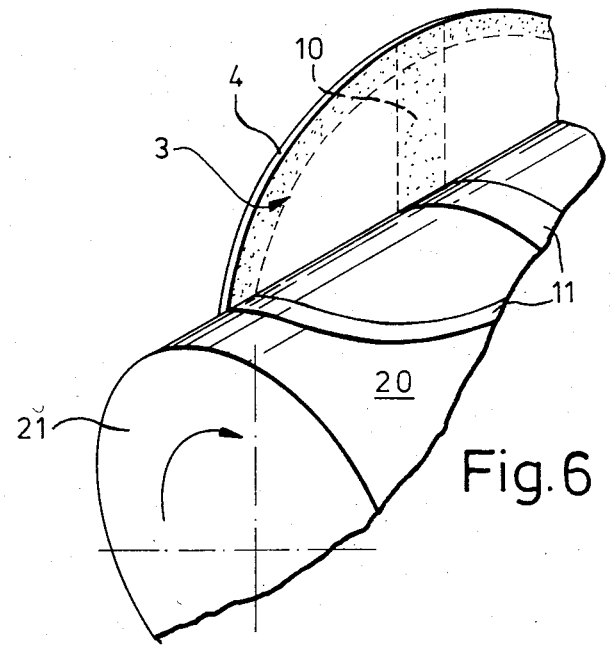
FIG. 6 is an oblique view of a cut-out from the production process.

In FIG. 6 the filter discs 3 are moved on the circumference 20 of a roller 21; production of the thickened zones 10 takes place here by a roll-on process in which additive material that is on the circumference of the roller 20 is transferred to the filter discs 3 and hardened subsequent to this process.

The drawings do not show a production method in the course of which the additive material is joined to the material that constitutes the filter disc 3 by being vaporized or sprayed onto the filter strip B or the filter discs, respectively. This case, too, results in narrow strips that strengthen the filter disc 3 that is very thin in and of itself.

Previous mention of a plastic additive material is taken to include all hardenable substances that can be internally bonded with the filter paper by means of an impregnation or vapor deposition process, such substances being non-aggressive to cellulose and having a softening point that lies above 200 deg. C.

Figure 7:
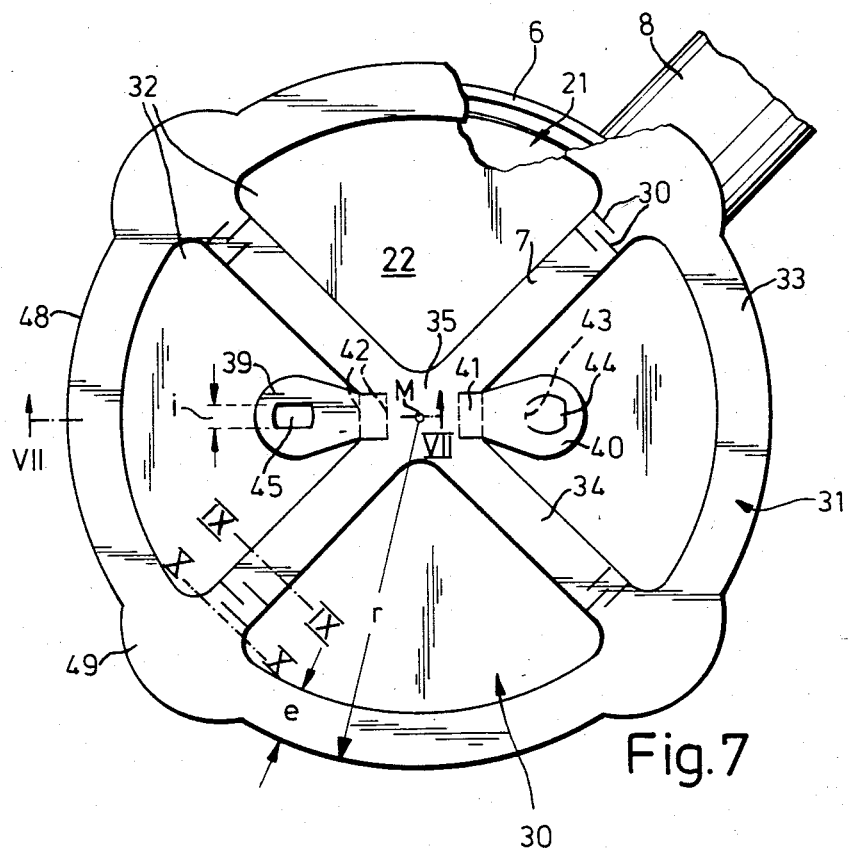
FIG. 7 is a plan view of another frying pan cover.

In FIG. 7 there is shown a disc-like cover 30 of radius r of approximately 180 mm which rests on the edge 6 of a frying pan 1 having a handle 8; this cover 30 has a cardboard carrier disc 31 and four sectors 32 are stamped out of this cover; the remaining parts of the carrier disc 31 result in an edge or carrier ring 33 of a width e that amounts to 20 mm as well as the one-piece spoke-like radial arms 34 that are centered on midpoint M of the disc and merge in a central area 35 of the carrier disc 31.

According to FIG. 7 in each of two opposite sectors 32 there are tabs 39, 40; each of these—also stamped out of the carrier disc 31—is connected by a narrow strip 41 to the central sector 35. The strips are delineated on both sides by fold lines 42, and can be bent up from the plane E of the disc, as can be seen in FIG. 8.

Figure 8:
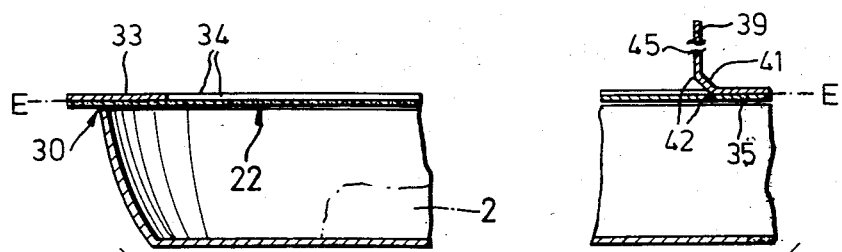
FIG. 8 is an enlarged partial radial section in FIG. 7 on the line VII—VII.

One tab 39 has a cutout portion 45 into which a tag 44—that can be folded on the line 43—of the other tab 40 can be inserted when the tabs 39, 40 are folded up as shown in FIG. 8; since the width of the tag 44 is greater than the width i of the cutout 45, the two tabs 39 and 40 will be secured together and thus form a lifting loop. Grip extensions 49 extend from the outer edge 48 of the carrier ring 33 in the embodiment described, and these grip extensions can either supplement or replace the lifting loop formed by the two tabs 39, 40.

A filter sheet 22 of filter cellulose is stretched and applied or secured by the so-called squeeze-welding technique beneath the carrier disc 31 or the carrier ring 33, respectively, and its radial arms 34; the filter sheet 22 lies beneath the sectors 32 and forms a filtering layer in these sectors.

Figure 9:
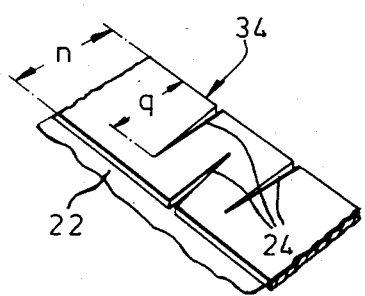
FIGS. 9 and 10 show an enlarged detail of FIG. 7 in oblique plan view from above and from below, respectively in section on lines IX—IX and X—X in FIG. 7.
Figure 10:
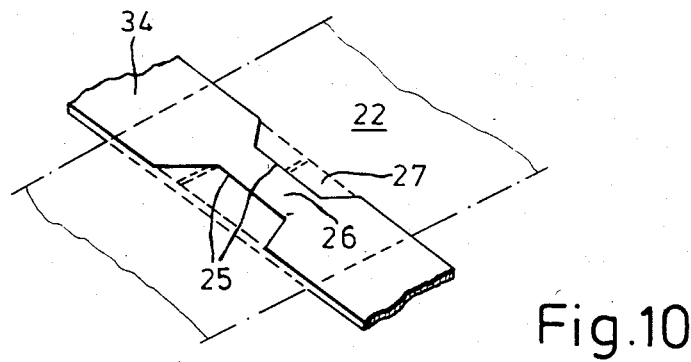

The cuts 24 in the radial arm can be seen in the plan view shown in FIG. 9. The length q of these cuts is somewhat less than the width n of the radial arm 34. The sublayer beneath FIG. 9 shows in FIG. 10 that the adhesion between radial arm 34 and the filter sheet 22 is very slight at this point; the lines 25 leave a narrow adhesion area 26 and the filter sheet 22 remains uncemented—in the zones marked 27—outside area 25.

What is claimed is:

1. A disc-shaped cover for a frying pan comprising a disc including a carrier ring, a plurality of spoke-shaped radial arms connected to said ring and defining open sectors therebetween, said arms having opposed radial edges, and a central region in which said radial arms merge, and a steampermeable filter of fibrous material secured to said disc on one side thereof to cover said open sectors, said filter being secured to said disc by a permanent adhesive means, said arms each having at least one transverse relief cut extending from one radial edge of the respective arm partially across the width of the arm to form a weakening zone permitting limited change in shape of the arm, said adhesive means between the filter and disc being reduced to a narrow zone at said relief cuts to leave an unadhered zone between the filter and disc adjacent said narrow zone.

2. A cover as claimed in claim 1 comprising a another said relief cut extending from the other of said edges of the respective arm parallel to the at least one cut.

3. A cover as claimed in claim 2 wherein said cuts extend at right angles to said edges over a length greater than one-half the width of the respective arm.

4. A cover as claimed in claim 1 wherein said arms are joined to said ring at juncture regions, said cuts being provided in said arms proximate said juncture regions.

5. A cover as claimed in claim 1 wherein said narrow zone extends longitudinally across said cuts.

* * * * *